United States Patent [19]
Saito et al.

[11] Patent Number: 4,967,178
[45] Date of Patent: Oct. 30, 1990

[54] APPARATUS FOR CONTROLLING A SEAT FOR VEHICLES

[75] Inventors: Masatsugu Saito, Yamato; Chikamasa Ikeda, Yokohama; Seiei Takeoka, Yokohama; Kazuji Katsutani, Yokohama, all of Japan

[73] Assignee: Niles Parts Co., Ltd., Tokyo, Japan

[21] Appl. No.: 480,337

[22] Filed: Feb. 13, 1990

Related U.S. Application Data

[63] Continuation of Ser. No. 399,402, Aug. 28, 1989, abandoned, which is a continuation of Ser. No. 256,157, Oct. 11, 1988, abandoned, which is a continuation of Ser. No. 61,039, Jun. 12, 1987, abandoned, which is a continuation of Ser. No. 831,287, Feb. 20, 1986, abandoned.

[30] Foreign Application Priority Data

Mar. 18, 1985 [JP]  Japan .................... 60-53994
Oct. 1, 1985 [JP]  Japan .................... 60-218780

[51] Int. Cl.$^5$ ........................... B60Q 3/00
[52] U.S. Cl. ................... 340/425.5; 340/460; 296/65.1; 364/424.05
[58] Field of Search .......... 340/425.5, 438, 459, 340/460, 461, 686, 995; 296/65.1; 297/330; 364/424.01, 424.02, 424.03, 424.04, 425

[56] References Cited

U.S. PATENT DOCUMENTS

| | | | |
|---|---|---|---|
| 2,890,299 | 5/1959 | Adams et al. ................. | 296/65 R |
| 4,140,996 | 2/1979 | Leitch et al. ................. | 340/52 F |
| 4,204,255 | 5/1980 | Cremer ........................ | 296/65 R X |
| 4,404,632 | 9/1983 | Harada et al. ................ | 296/65 R X |
| 4,438,422 | 3/1984 | Nojiri et al. ................. | 340/52 F |
| 4,463,426 | 7/1984 | Caddick et al. .............. | 296/65 R X |
| 4,513,377 | 4/1985 | Hasebe et al. ................ | 340/995 X |
| 4,517,565 | 5/1985 | Nakamura et al. ............ | 340/995 |

FOREIGN PATENT DOCUMENTS

| | | | |
|---|---|---|---|
| 0075232 | 6/1981 | Japan ............ | 340/52 R |
| 0155132 | 9/1982 | Japan ............ | 340/52 R |
| 58-53524 | 3/1983 | Japan . | |
| 0078839 | 5/1985 | Japan ............ | 340/52 F |

*Primary Examiner*—Joseph A. Orsino
*Assistant Examiner*—Brian R. Tumm
*Attorney, Agent, or Firm*—Ronald P. Kananen

[57] ABSTRACT

An apparatus in which the posture of a seat for vehicles is controlled in accordance with the output from a mode selecting circuit in response to the operation of a manually operated switch composed of a mode select switch and increasing/decreasing switches, and the posture controlling direction is announced by means of displaying means. By contrast, in the second embodiment as illustrated in FIG. 2, the input to the LCD controlling circuit 260 and to the voice synthesizer 210' is dependent only upon the control mode selected by the switch 13. Thus, only the selected control mode is displayed in the audio and visual ways. Of course, the invention includes all such variations and modifications of combinations of the features disclosed for both embodiments. Such announcement is made visually and audiometrically. The mode selecting circuit supplies a signal representing the posture controlling direction to an announcing device by operation of the increasing-/decreasing switches. An apparatus for controlling a seat for vehicles in which the control mode selected by an operator is displayed and the control direction of the seat is also displayed. In the case where the announcing device utilizes a voice, there are provided inhibiting means for inhibiting the voice announcing signal when the mode selecting means is continuously operated, and reset means for resetting or turning off or disabling the mode selecting device when no operation of the manually operated switch is effected for a predetermined time interval.

7 Claims, 3 Drawing Sheets

APPARATUS FOR CONTROLLING A SEAT FOR VEHICLES

BACKGROUND OF THE INVENTION

1. Field of the Invention

The present invention relates to an apparatus for electrically controlling the sitting posture of the seat for a vehicle, and to an apparatus for controlling a seat for a vehicle capable of displaying a posture controlling direction visually and audiometrically.

2. Description of the Prior Art

Hitherto, there has been known in the prior art a conventional apparatus for controlling a seat for a vehicle, in which the posture of the seat can be controlled by controlling the amount of pressure supplied to air bags provided at the side support portions of the back, side and thigh, the amount of angle of a reclining portion, the amount of height, of a lifter for adjusting the seat in height and the amount of the sliding movement of a slider for adjusting the seat in a forward or a backward direction, in accordance with the output of a mode selecting circuit for effecting a mode selection in accordance with mannually-operated switches composed of a mode select switch and increasing-decreasing switches. Such a conventional apparatus is described in, for example, Japan Patent Non-Examined Publication No. 58-53524. According to such a conventional apparatus, it is necessary to provide many switches in accordance with the kinds of the support portions thereby making the operation complex. Moreover there is a possibility of an inadvertent touching of the switches during running of the vehicles, thereby causing a dangerous malfunction. Furthermore, in the case of operating a plurality of switches, it is not only unclear in what direction and what support portion is controlled, but it also is very dangerous to control the seal in a non-intended direction.

SUMMARY OF THE INVENTION

The object of the present invention is to provide an apparatus for controlling a seat for a vehicle in which the posture of the seat of the vehicle is controlled in accordance with the output from a mode selecting circuit, for effecting selection in accordance with manually-operated switches including a mode select switch and increasing/decreasing switch, wherein the control mode selected by an operator is visually and audiometrically displayed by using displaying means and the same increasing/decreasing switches are used for all modes, thereby improving the operational performance of the apparatus for controlling a seat for vehicles.

The above-mentioned object of the present invention is achieved as follows.

The seat-controlling apparatus of the present invention is constituted such that in the seat-controlling apparatus in which the posture of the seat of a vehicle is controlled in accordance with the output from a mode selecting circuit, for effecting mode selection in accordance with manually-operated switches including a mode select switch and increasing/decreasing switches, the control mode is displayed by using displaying means, and there is provided means for applying a signal indicative of a posture-controlling direction to the displaying means by operating the increasing/decreasing switches with respect to the current setting of the mode-selecting circuit. Furthermore, the for announcing the above control mode by using voice generating means, comprises inhibit means connected to a start input portion of an electric power source for inhibiting the announcing voice during a mode switching time due to the operation of the mode selecting means, and reset means for resetting the mode selecting means in accordance with a predetermined time interval of non-operation of the manually operated switch.

According to the combination mentioned above, the posture control mode can be cyclically switched by the mode selecting circuit when the mode select switch of the manually-operated switches is operation. If one of the increasing/decreasing switches is then operated, the corresponding posture control direction is displayed on the displaying means in accordance with the signal from the mode-selecting circuit and simultaneously the seat of the vehicle can be controlled for the selected posture in accordance with the displayed control mode and control direction. When the posture control mode is cyclically changed in accordance with the output of the mode selecting means which changes according to the operation of the corresponding manually operated switch, the voice generating means announces the selected control mode, and the announcement by the voice is inhibited by the inhibiting means during the selecting operation of the control mode and during the continuous operation of the corresponding manually-operated switch. Further, the mode selecting means can be reset in an initial state thereof, or the electric power source is cut off, by the reset means, when the manually operated switch is not operated within at least a predetermined time.

As a result, the posture of the seat of the vehicle in accordance with the present invention can be achieved by using only two manually-operated switches, thereby making easy the operation for controlling the posture of the seat of the vehicle and achieving a safe and precise control, since the control mode and the control direction are visually and audiometrically displayed.

The above and other features and advantages of the present invention will be more clear from the following description of the embodiments with reference to the accompanying drawings.

DETAILED DESCRIPTION OF THE PREFERRED EMBODIMENTS

Figure 1:
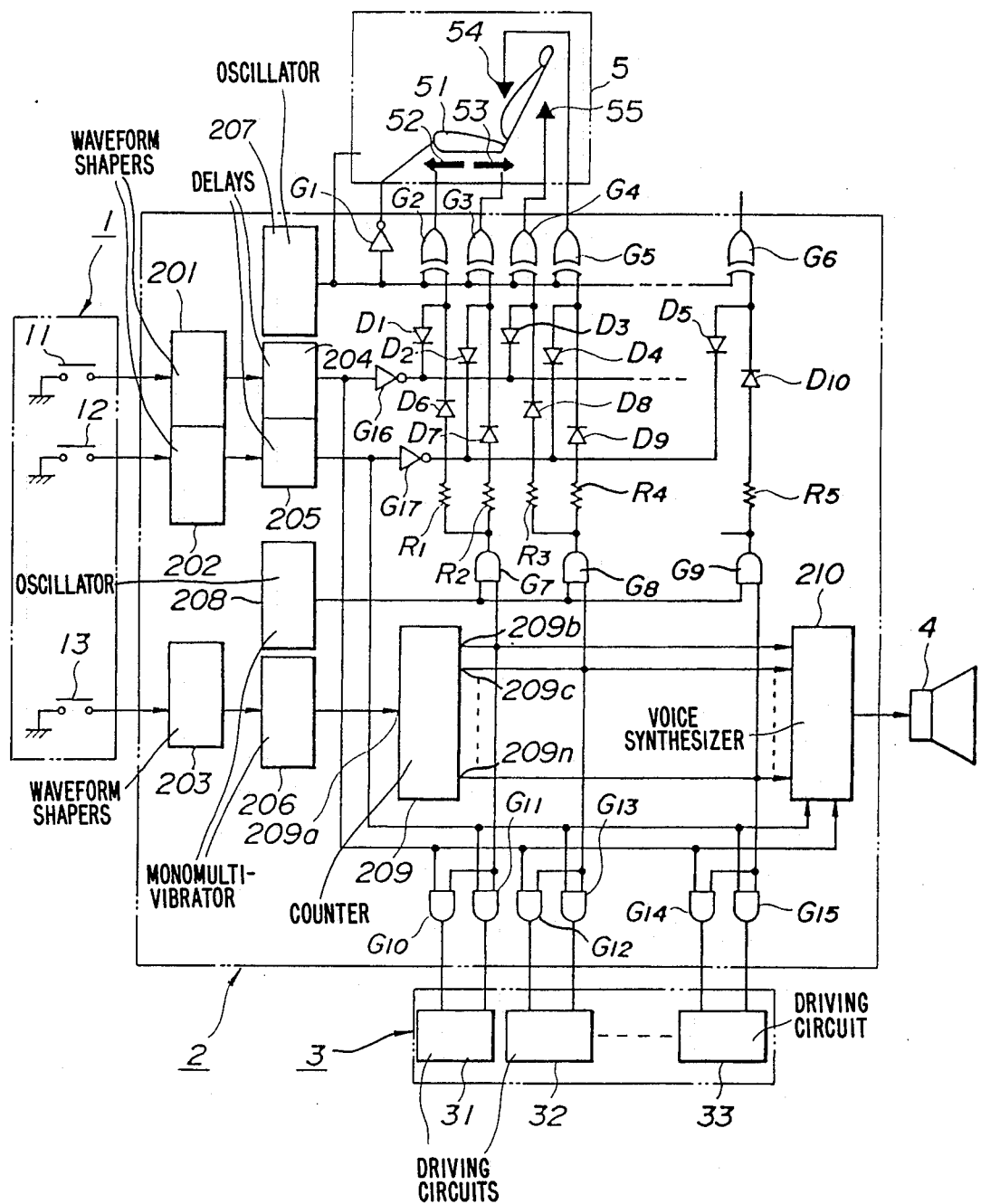
FIG. 1 is a view showing the electric circuit of the preferred embodiment of the apparatus for controlling a seat for vehicles of the present invention.

Referring now to FIG. 1, numeral 1 denotes generally manually operated switch means comprising increasing/decreasing switches 11, 12; and a mode select switch 13, a mode selecting circuit 2 which in this drawing includes a voice synthesizer 210, a posture controlling circuit 3, a speaker 41 for announcements and a display section 5. A displaying means is composed of the voice announcing elements (including the voice synthesizer 210 and the speaker 4) and the display ing section 5. Furthermore, the mode selecting circuit 2 is composed of waveform shaping circuits 201, 202 and 203, delaying circuits 204 and 205, and a monomulti vibrator 206. Each of the delaying circuits 204 and 205 and the monomultivibrator 206 has a delaying function to avoid unsuitable operation of the mode selecting circuit 2 due to malfunction of the manually operated switch means 1 such as a chattering. Numerals 207 and 208 denote a first and second oscillation circuits respectively. The first oscillating circuit 207 generates an AC signal with a frequency, of for example, 32 Hz for driving the displaying section 5, and the second oscillating circuit 208 generates an AC signal with the frequency, for example, of 1 Hz for flickering the displaying section 5. In this case, the second oscillating circuit 208 may be replaced by a device for dividing the oscillated signal from the first oscillating circuit 207, by a binary counter, or the like.

Numeral 209 denotes a counter circuit such as a counter of the 8-state type. The counter 209 has an input section 209a wherein ouput sections 209b to 209n, and a high level "1" is sequentially output to each successive one of the output sections from 209b to 209n each time that one pulse is input into the input section 209a, and this sequential output is cyclically repeated with repetition of the input pulses to the input section 209a.

Numeral 210 denotes a voice synthesizing circuit for outputting a voice synthesized signal to a voice announcing speaker 41 at the rear stage, by the inputting of and input signal from the counter circuit 209 or the delay circuits 204 and 205. The voice synthesized by the voice synthesizing circuit 210 annouces the posture control mode, or the control direction when the increasing/decreasing switches 11 and 12 are operated. The control mechanism of the voice synthesizing circuit 210 will be explained in detail with reference to FIG. 2.

Logic circuitry for driving and controlling the display section 5 comprises inverters G1, G16, G17, exclusive OR gates G2 to G6, AND gates G7 to G9, diodes D1 to D10, resistors R1 to R5. AND gates G10 to G15 provide logic circuitry for controlling the posture controlling circuit 3.

The above mentioned posture controlling circuit 3 is composed of driving circuits 31 to 33 for respectively driving activators such as of an air pump for controlling the inner pressure of air bags disposed within the seat of the vehicle, an electric motor for slidably moving the seat forwardly or backwardly, and an electric motor for controlling the angle of the reclining portion. Additionally, the posture controlling circuit 3 is controlled in accordance with the logic condition of the AND gates G10 to G15 inputting the outputs from the counter circuit 209 and the delay circuits 204 and 205 in the mode selecting circuit 2.

The display section 5 includes a liquid crystal display and is disposed where it is visible to the user using the seat, such as adjacent to the manually-operated switches. The display section 5 is composed of the segments 52, 53 adjacent the seat symbol 51 for displaying the control direction of the sliding portion of the seat, the segments 54, 55 for displaying the control direction of the reclining portion of the seat, and other segments (not shown) for displaying the vertical position of the seat and the control directions of the side support (not a part of the seat itself), lumbar support, and side support disposed within the seat. Each segment of the displaying section 5 is controlled, on the basis of the logic conditions of the counter circuit 209 and the delaying circuits 204 and 205, through the exclusive OR gates G2 to G6.

In operation, if the manually operated switch means 1 is operated by the user in the vehicle to control the posture of the seat suitably, including sequentially operating mode selecting switch 13, a high level signal "1" is sequentially output from the output sections 209b. . . 209n of the counter circuit 209. For example, if the output section 209b is at high level "1", an output is provided from the AND gate G7 is oscillated when both inputs of the AND gate G7 become a high level "1", namely when the output of the second oscillating circuit 208 becomes a high level. This oscillation output drives the segment 52 and 53 through the diodes D6 and D7 and the exclusive OR gates G2 and G3; as a result, the segments 52 and 53 flicker. At this time, the voice synthesizing circuit 210 also outputs a signal to the voice announcing section 4', whereby a voice announces for instance that "the sliding portion was selected".

In the above state, if the decreasing switch 11 out of the increasing/decreasing swtiches 11 and 12 is operated, the cathode side of the diode D1 changes to a low level "0" through the delay circuit 204. As a result, the above segment 52 is deenergized and the segment 53 flickers, thereby displaying the posture control direction. At this time, the voice synthesizing circuit 210 announces, for instance, that "the seat is moving in the backward direction", as a result of the input from the delay circuit 204. Simultaneously, the output of the AND gate G10 changes to a "1" by the inputs from the output section 209b of the counter circuit 209 and the delay circuit 204, thereby driving the actuator for driving the motor for moving the seat in the backward direction through the driving circuits 31.

Furthermore, even when another posture control mode is selected, the control of the seat is similarly effected and the control mode and the control direction are displayed by using the displaying means.

The displaying means is not limited to the above mentioned embodiment, and may be any type of a device capable of announcing the posture control mode and the control direction to the user of the seat. Therefore, the visual display may be achieved by using an audio-visual apparatus utilizing CRT displays. The display of the present invention may as well be combined with another display 6, such as a navigation display, a vehicle information display, or an alarm display.

Figure 2:
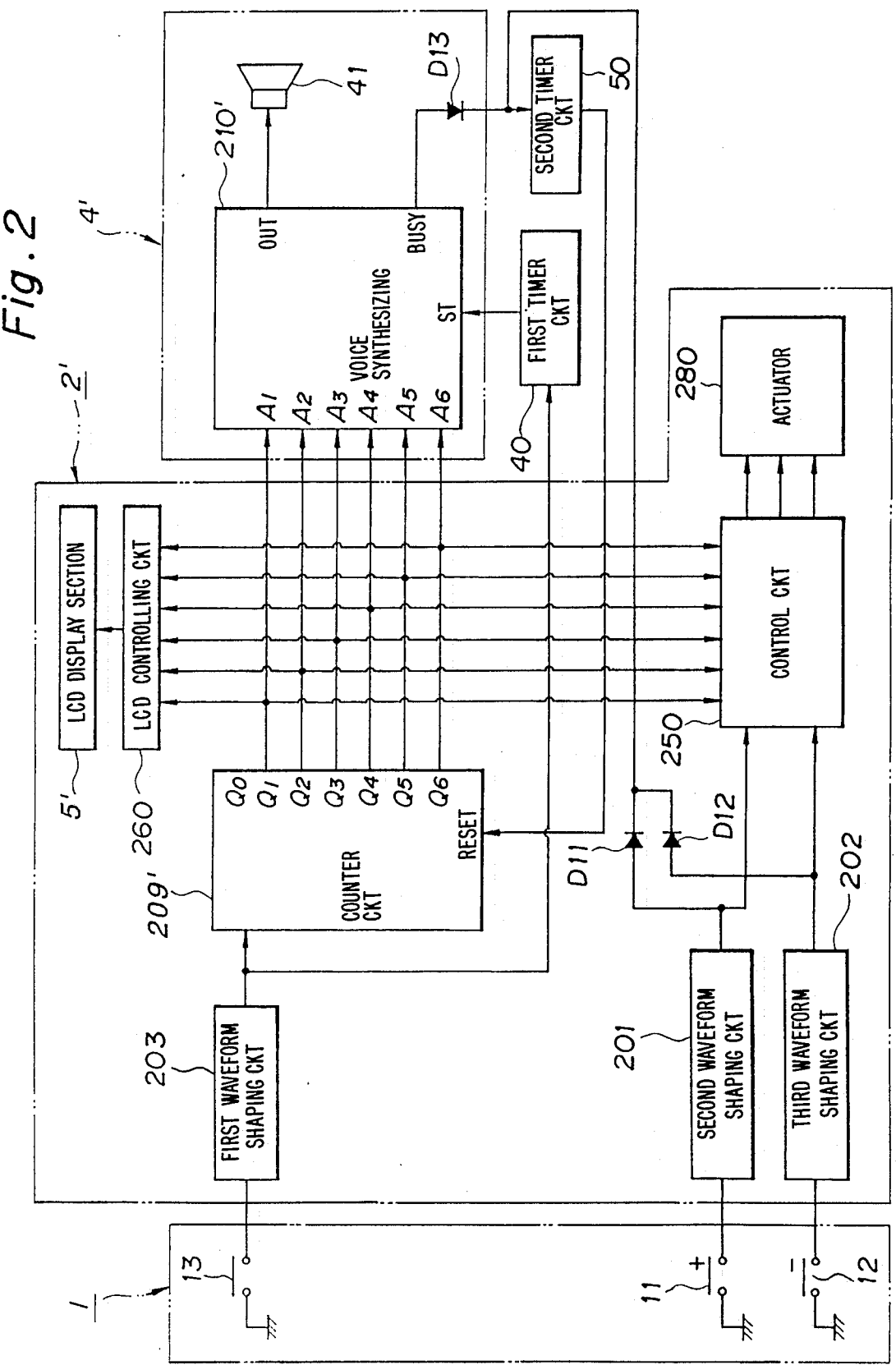
FIG. 2 is a view showing the electric circuit of the preferred embodiment of a voice announcing means.
Figure 3:
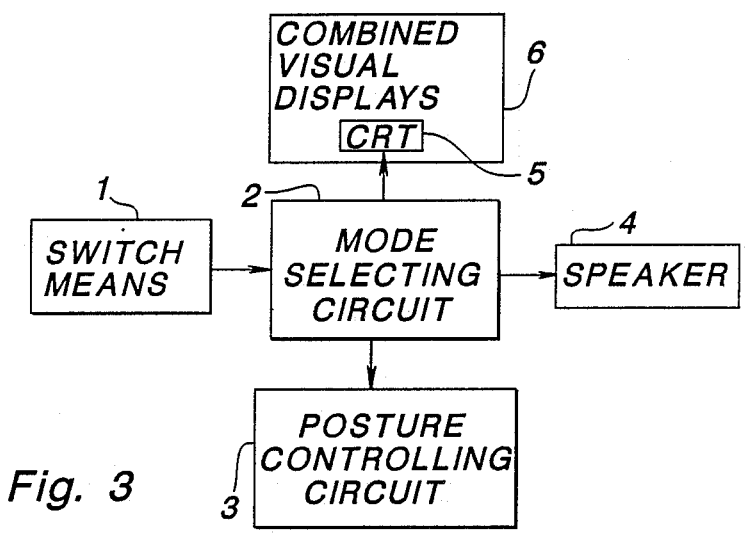
FIG. 3 indicates another embodiment of the present invention.

Referring to FIG. 2, a preferable control mechanism for controlling the voice synthesizing circuit will be explained hereinafter. In FIG. 2, the same parts as shown in FIG. 1 are shown by using the same reference, numbers as in FIG. 1, an similar parts are shown with different or primed reference numerals. The difference between similar but not identical parts can be seen from a comparison of the two drawings and the description of their respective parts, such as where corresponding parts are included in different subassemblies in the two drawings.

FIG. 2 shows a manually operated switch means 1 which can be disposed adjacent to the seat for being operated by the user, a mode selecting circuit 2 for controlling the seat control mode, a voice announcing section 4', a first timer circuit 40 for serving as an inhibiting means, and a second timer circuit 50 for serving as a reset means.

More specifically, the manually operated switch means 1, as in FIG. 1 is composed of a mode select switch 13 for selecting the control mode and the switches 11 and 12 for increasing and decreasing the amount of each posture control for the seat.

The posture controls for the seat include the amount of air pressure in the air bags disposed at the support portions of the back, sides and thigh, the amount of angle of the reclining seat, the amount of height of the lifter for adjusting the height of the seat, and the amount of movement of the slider for sliding the seat in the forward and backward directions.

Furthermore, the mode selecting circuit 2' includes first, second and third waveform shaping circuits 203, 201 and 202 connected to the manually operated switches 13, 11 and 12, respectively, a counter circuit 209' connected to the mode select switch 13 through the first waveform shaping circuit 203, a control circuit 250 and a LCD controlling circuit 260, both connected to the output sections Q1 ... Q6 of the counter circuit 209', an LCD display circuit 5' connected to the output section of the LCD controlling circuit 260, and an actuator 280 connected to the output section of the control circuit 250. As seen from FIG. 2, the diodes D11 and D12 provide inputs from the second and third waveform shaping circuits 11, 12 to the second timer circuit, in a manner entirely similar to the input via diode D13 from the BUSY output of the voice synthesizing circuit 210'.

The outputs from the output sections Q1 ... Q6 of the counter circuit 209' are all at zero level when the control mode is in the initial condition or the counter 209' is in a reset condition, and the high level signal "1" is output from the output section Q1 to the output section Q6 sequentially in accordance with each sequential operation of the mode select switch 13. Then the control circuit 250 outputs a signal to the actuator 280, which is composed for instance of a reversible motor for controlling the air pump for air bags and the seat position such as the reclining angle, thereby effecting the posture control of the seat. On the other hand, the LCD controlling circuit 260 outputs a signal to the LCD displaying section 5' to display the control mode in accordance with the state of the output sections Q1 ... Q6 of the counter circuit 209'.

Furthermore, the voice announcing sections 4 is in this embodiment composed of a voice synthesizing circuit 210', a doiode D13, and a speaker 41, and the address input sections A1 ... A6 of the voice synthesizing circuit 210' are connected to the output sections Q1 ... Q6 of the counter circuit 209' respectively. The start input section ST of the voice synthesizing circuit 210' is connected to the first waveform shaping circuit 203 through the first timer circuit 40, and the busy output section BUSY of the voice synthesizing circuit 210' is connected to the reset section RESET of the counter circuit 209' through the diode D13 and the second timer circuit 50. In the voice synthesizing circuit 210', an announcing voice is synthesized in accordance with the input signal of the address input sections A1 ... A6 when the signal is applied to the start input section ST, the voice signal is output from the output section OUT, and an interrupt inhibiting signal is output from the busy output section BUSY of the voice synthesizing circuit 210'.

The first timer circuit 40 is composed of a delay circuit, and its operation is started in accordance with the operation of the mode select switch 13, whereby the start signal is input to the start input section ST of the voice synthesizing circuit 210' after a predetermined time t1, such as one second. If the mode select switch is operated during the operation of the first timer circuit 40, the operation of the first timer circuit 40 is reset to start again from the initial state thereof. Therefore, the start signal is not applied to the start input section ST of the voice synthesizing circuit 210' while the control mode is changed sequentially with a time interval shorter than the predetermined time t1.

The second timer circuit 50 is also composed of a delay circuit. Its operation is started in accordance with the end of the interrupt inhibiting signal output from the busy output section BUSY of the voice synthesizing circuit 210. The reset signal is applied to the reset input section RESET of the counter circuit 209' after a predetermined time t2 such as one minute to five minutes. The second timer circuit 50 again operates when the interrupt inhibiting signal is input during the operation of the timer. Therefore, according to the second timer circuit 50, the reset signal is not applied to the reset input section RESET of the counter circuit 209' while the interrupt inhibiting signal is output from the busy output section BUSY of the voice synthesizing circuit 210' with a time interval shorter than the predetermined time t2.

As mentioned above, if the mode select switch 13 is sequentially operated, the voice announcement from the speaker 41 in the voice announcing section 4 is inhibited by the delay operation of the first timer circuit 40. Furthermore, in the case where the manually operated switch 1 is not operated after the predetermined time t2, the counter circuit 209' is returned to its initial state by the second timer circuit 50.

It is, of course, possible to stop the inhibiting means by turning off the electric power to the mode selecting means.

As mentioned above in detail, the present invention is featured by providing the means for supplying the signal representing the posture controlling direction to the displaying means by operating the increasing/decreasing switch. Specifically, in the first embodiment, as is made clear by the circuitry illustrated in FIG. 1, when the operator selects a control mode, the display indicates this selection, and when the operator subsequently operates the increasing/decreasing switch means, the increasing or decreasing direction for the respective setting is displayed for the selected direction of change in that control mode. As a result, excellent advantages such are obtained that the number of switches can be reduced, thereby making simple the switching operation, and that the posture control direction is clearly displayed by the displaying means.

Furthermore, the displaying means may be used in combination with other displaying means, such as an audio visual apparatus. According to the voice announcing means of the present invention, since the selected control mode is acknowledges by means of voice, there is no occurence of malfunction of the switching operation even if the switch is operated without seeing it, and further, a tedious announcing voice is not produced when the control mode is quickly changed. Furthermore, when the seat control is not effected, the control mode is automatically reset to the initial state or the electric power is turned off; therefore, no malfunction is produced even when one touches to the switch inadvertently. This results in an apparatus for controlling a seat for vehicles with excellent performance in operation and safety.

As mentioned above, while the present invention has been particularly described with reference to specific embodiment thereof, it is to be understood that the words which have been used are words of description rather than limitation and that changes may be made within the purview of the appended claims without departing from the true scope and spirit of the present invention in its broader aspects.

We claim:

1. An apparatus for controlling the settings of each of a plurality of degrees of freedom of parts of a vehicle, including parts of a seat of the vehicle for changing the posture of the seat for the comfort of the driver sitting in it, said apparatus comprising a manually-operated mode select switch for selecting one at a time in a predetermined order by the repeated operation of said mode select switch each of a plurality of control modes of said seat, each said control mode corresponding to a respective one of said degrees of freedom, and a manually-operated increasing/decreasing switch means for selecting an increasing or decreasing of the respective setting of the degree of freedom of the currently selected control mode, said increasing/decreasing switch means being operated identically in each said selected mode for said selective increasing or decreasing of the respective setting, a control circuit for selecting each said control mode and for changing the setting of each said degree of freedom in accordance with the operation by the driver of said mode select switch and increasing-/decreasing switch means, and display means for visually displaying which of said control mode is currently selected and whether said respective setting for said selected control mode is being increased or decreased, according to respective signals input thereto, wherein said control circuit comprises means for generating and supplying said signals to said display means representing said currently selected control mode and whether the respective setting is being changed according to said operation of said increasing/decreasing switch means, and wherein said display means comprises a voice generating means for announcing, after a predetermined delay, which of said control modes was selected by said driver, said voice generating means including a start input section for receiving a start signal indicating that said announcing of said selected control mode is to begin, an inhibiting means connected to said start input section for providing said start signal thereto with a delay of a first predetermined period after said selecting by said driver of said selected control mode, for delaying said announcing of each said selected control mode for said predetermined period, wherein if a subsequent control mode is selected by operation of said mode select switch during said first predetermined period the announcement of the previously selected control mode does not occur, and reset means for resetting said control circuit to an initial condition in accordance with no operation of either said mode select switch or said increasing-/decreasing switch means for at least a second predetermined period which is longer than said first predetermined period, said initial condition of said control circuit being such that subsequent operation of said mode select switch by said driver recommences said selection of said control modes in said predetermined order from said initial state.

2. The apparatus for controlling a seat for vehicles according to claim 1, wherein said display means for said visual display comprises a liquid crystal display.

3. The apparatus for controlling a seat for vehicles according to claim 2, wherein said display means includes a CRT display in combination with another display in said vehicle.

4. The apparatus for controlling a seat for vehicles according to claim 1, wherein said display means includes a CRT display.

5. The apparatus for controlling a seat for vehicles according to claim 1, wherein said display means includes a CRT display in combination with another display means in said vehicle.

6. The apparatus for controlling a seat for vehicles according to claim 1, wherein said display means comprises a liquid crystal display.

7. The apparatus for controlling a seat for vehicles according to claim 1, wherein said display means is provided in combination with another display in said vehicle.

* * * * *